July 23, 1929.  J. D. DURANT  1,721,617
GAUGE CONNECTION
Filed July 7, 1926
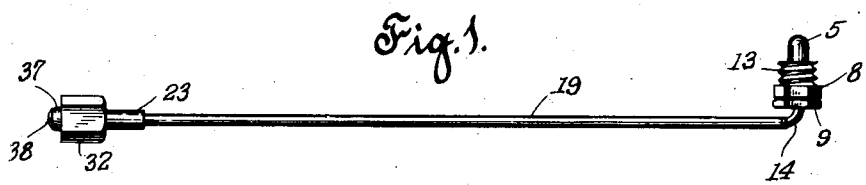
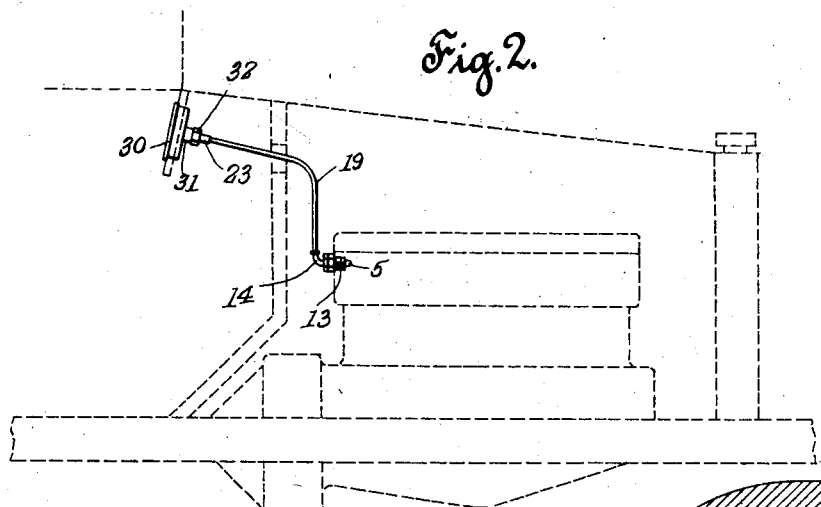
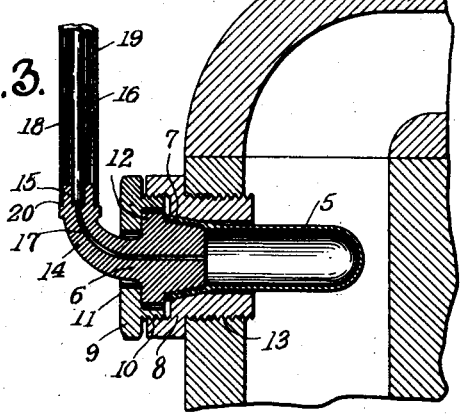
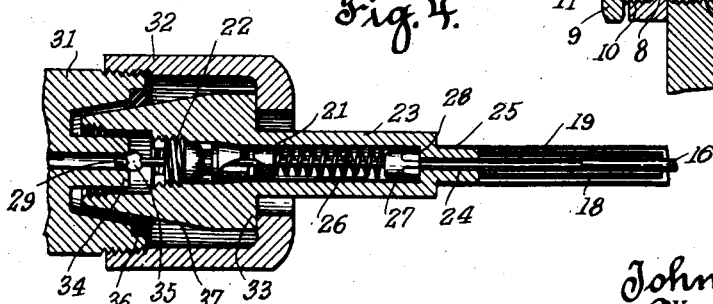
INVENTOR.
John D. Durant
BY Philip S. McLean
ATTORNEY Patented July 23, 1929.

1,721,617

UNITED STATES PATENT OFFICE.

JOHN D. DURANT, OF NEW YORK, N. Y., ASSIGNOR TO BLUE RIBBON SALES AGENCY, INC., OF NEW YORK, N. Y., A CORPORATION OF NEW YORK.

GAUGE CONNECTION.

Application filed July 7, 1926. Serial No. 121,044.

This invention relates to motor heat gauges and the like and particularly to the pressure transmission connection which extends from the thermostat or sensitive element to the gauge or indicating instrument. This connection confines the pressure column forming the transmission medium between the sensitive element and the indicator and to be effective, must be coupled in sealed relation to both.

In assembling motor heat gauges and the like, the usual practice is to mount the sensitive device in the motor cooling circulatory system and to then pass the transmission connection extending therefrom through an opening in the dash of the car and connect it at the back of the gauge instrument mounted on the panel. This mode of assembly and other practical limitations ordinarily prevent the gauges from being furnished in coupled or assembled relation or at least requires the uncoupling of the parts before they can be mounted. These requirements and limitations mean that special care must be exercised in inserting the gas or liquid which provides the pressure transmitting medium or in preventing loss of such medium when the parts are connected up in their final relation.

The objects of this invention are to seal the pressure transmission connection after the transmitting medium has been supplied thereto at the factory and to open said connection only after the same has been brought into proper operative relation to the instrument with which it is to be associated and to accomplish these effects simply, inexpensively and in an entirely practical way.

The foregoing and other desirable objects are attained in this invention by certain novel features of construction, combinations and relations of parts as set forth in detail hereinafter and covered broadly in the appended claims.

The drawing accompanying and forming part of this specification illustrates one practical embodiment of the invention, but as such illustration is primarily for purposes of disclosure, it should be understood that the physical embodiment of the invention is not limited to this particular form but is susceptible to various modifications, all within the broad scope of the claims.

Figure 1 is an elevation of the complete connection.

Figure 2 is a partly diagrammatic view of the invention as in use with the sensitive plug at one end entered in the motor block and the coupling at the opposite end engaged with the indicating instrument on the panel.

Figure 3 is an enlarged sectional view of the motor end of the connection.

Figure 4 is a similar view of the instrument end of the connection.

The thermally sensitive device consists in the present disclosure of a thin cartridge or thimble 5 adapted to hold a body of the pressure transmitting fluid or liquid in the water circulating jacket of the motor. This thimble is shown as closed at its open end by a plug 6 with which it has a taper screw thread connection 7, which may be permanently sealed by brazing or soldering.

The external tapered portion of this device seats in the correspondingly tapered socket in the supporting bushing 8, and is held therein by a nut 9 screwed in the bushing at 10 and having an annular flange 11 overstanding a shoulder 12 on the plug 6. The bushing 8 is screw threaded externally after the manner of an ordinary spark plug, enabling the device to be mounted in a screw seat 13 provided for the purpose in the wall of the water jacket.

The outer end of the plug 6 is shown as formed with a reduced neck or extension 14 provided with a socket 15 in the end of the same for the pressure transmission tube 16 and a small passage 17 extends through the plug into this socket so that the tube is in communication with the chamber at the inner end of the plug.

To insulate the pressure transmission tube from local temperature conditions, the same is shown as surrounded by a cover 18 of paper or the like which in turn is enclosed within an evacuated envelope 19, which latter is secured over a reduced shouldered portion 20 on the end of the angled or curved neck 14.

The free end of the connection is sealed in the present disclosure by a self closing spring seated valve 21 which as shown in Figure 4 may be an ordinary pneumatic tire valve, secured by its mounting screw 22 in a special sleeve 23 which is secured to and forms the terminal of the pressure transmitting tube and its insulating sheath. This sleeve is shown as having a socket 24 for the end of the transmission tube and as shouldered at 25 for the end of the insulating envelope. The passage 26 through this sleeve is shaped to freely receive the stem and spring structure of the tire valve with the abutment 27 for the spring resting against a shoulder 28 in the end of the bore and with the parts so positioned that the outer end of the stem 29 is housed within and does not project beyond the end of the sleeve. Consequently, when this valve is screwed into the sleeve it will serve as a closure sealing the end of the transmission tube.

The gauge instrument indicated at 30 is so constituted that when the connection is coupled thereto, the sealing valve will be automatically opened and communication be thereby established between the thermal plug and gauge.

In the present disclosure the coupling neck 31 at the back of the gauge is screw threaded to take the coupling nut 32 which surrounds the sleeve and has a bearing against the shouldered head portion 33 of the sleeve and this neck is provided with a central tubular protuberance 34 positioned to receive the end of the valve stem and by engagement with the head or enlargement 35 on said stem adapted to force the valve open as the parts become properly coupled together. To afford a fully sealed joint at this coupling, a gasket 36 is shown seated in the end of the coupling neck and the head of the coupling sleeve is shown as having a tapered portion 37 adapted to enter said gasket.

To protect the valve in transit the end of the bore in the terminal may be closed over the valve stem by a cap shown simply as a small screw plug 38 entered in the outer screw threaded end of the bore.

In making up the apparatus, liquid, gas or air may be used as the transmitting medium and may be supplied to the thermal unit before or after the valve is placed in position. When the valve is in place and the device is charged with the transmission fluid, the valve then serves as a seal for such medium, keeping the same intact until such time as the device is coupled up with the gauge instrument. This may be quickly effected with the coupling shown, after the protective plug 38 has been removed, the act of coupling the gauge and connection automatically forcing back the valve to establish proper communication with the sensitive device. At any subsequent time, if the coupling is broken, the valve immediately becomes effective to seal the transmitting medium and prevent loss of the same.

What is claimed is:

1. In apparatus for indicating special conditions such as temperature, the combination with means responsive to the conditions which are to be indicated, a conduit extending therefrom for confining a column of pressure transmitting medium, valve mechanism carried by the free end of said conduit, said valve mechanism automatically closing to confine said column to the responsive means when said free end of the conduit is unconnected with other parts, a gauge instrument calibrated to indicate the conditions aforesaid, a coupling between the free end of the conduit and said gauge instrument and means for opening said valve mechanism to automatically establish communication between the gauge instrument and pressure transmission column when the conduit is coupled to the gauge instrument.

2. In apparatus for indicating special conditions such as temperature, the combination with means responsive to the conditions which are to be indicated, a conduit extending therefrom for confining a column of pressure transmitting medium, valve mechanism carried by the free end of said conduit, said valve mechanism automatically closing to confine said column to the responsive means when said free end of the conduit is unconnected with other parts, a gauge instrument calibrated to indicate the conditions aforesaid, a coupling between the free end of the conduit and said gauge instrument, means for opening said valve mechanism to automatically establish communication between the gauge instrument and pressure transmission column when the conduit is coupled to the gauge instrument and a closure removably engaged with the free end portion of the conduit for mechanically closing the same independently of the valve mechanism.

3. In apparatus of the character disclosed, the combination with means responsive to conditions which are to be indicated, of a conduit in communication therewith for confining a column of pressure transmission medium and a self-closing valve carried by said conduit in the free end of the same for automatically sealing said pressure transmission column to the responsive means when said conduit is unattached to other parts.

4. In combination, a plug provided with means for securing the same in the cooling circulating system of a motor, a tubular pressure connection extending from said plug and a self-closing valve in the free end of said connection.

5. In apparatus of the character disclosed, a pressure actuated gauge, a pressure transmission connection thereto, a coupling for effecting union of said connection with the gauge, sealing means for the connection adapted to be automatically opened in the coupling of the parts as described and a guard for positively preventing accidental opening of the sealing means when the connection is detached from the gauge.

6. In apparatus of the character disclosed, a pressure actuated gauge, a pressure transmission connection thereto, a coupling for effecting union of said connection with the gauge and sealing means for the connection adapted to be automatically opened in the coupling of the parts as described, said sealing means comprising a pneumatic tire valve seated in the end of the connection and the automatic opening means including a projection carried by the gauge for engagement with the stem of said tire valve when the parts are properly coupled.

7. A thermally sensitive device comprising a thimble having a tapered screw threaded mouth, a tapered screw threaded plug entered therein, a screw bushing having a tapered seat receiving the externally tapered portion of the thimble, the plug having a shoulder and a nut screwed into the bushing over said shoulder.

8. A thermally sensitive device comprising a thimble having a tapered screw threaded mouth, a tapered screw threaded plug entered therein, a screw bushing having a tapered seat receiving the externally tapered portion of the thimble, the plug having a shoulder and a nut screwed into the bushing over said shoulder, said nut having a passage therethrough, the plug having a reduced neck extending through said passage and a pressure transmission tube connected to said neck.

In witness whereof, I have hereunto set my hand this 25th day of June, 1926.

JOHN D. DURANT.